United States Patent

Edsö et al.

(10) Patent No.: US 7,050,653 B2
(45) Date of Patent: May 23, 2006

(54) IDENTIFICATION OF VIRTUAL RASTER PATTERN

(75) Inventors: Tomas Edsö, Lund (SE); Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 838 days.

(21) Appl. No.: 09/812,907

(22) Filed: Mar. 21, 2001

(65) Prior Publication Data

US 2002/0044138 A1 Apr. 18, 2002

Related U.S. Application Data

(60) Provisional application No. 60/210,647, filed on Jun. 9, 2000, and provisional application No. 60/261,123, filed on Jan. 12, 2001.

(30) Foreign Application Priority Data

| Apr. 5, 2000 | (SE) | ................................................ 0001235 |
| Nov. 10, 2000 | (SE) | ................................................ 0004132 |

(51) Int. Cl.
*G06K 9/36* (2006.01)

(52) U.S. Cl. ........................ 382/280; 382/181; 382/197; 375/240.16; 326/307

(58) Field of Classification Search ................. 382/276, 382/181, 190, 197, 232, 280, 100, 287, 288, 382/286, 306, 252, 112, 168, 465, 203; 375/240.16; 359/29, 559; 324/76.21, 76.22, 307; 345/179; 235/462.15, 494, 470

See application file for complete search history.

(56) References Cited

U.S. PATENT DOCUMENTS

| 4,977,458 | A | * | 12/1990 | Granger et al. ............ 358/3.26 |
| 5,091,966 | A | | 2/1992 | Bloomberg et al. |
| 5,555,313 | A | | 9/1996 | Zheng et al. |
| 5,734,412 | A | * | 3/1998 | Hasebe et al. ............... 347/247 |
| 5,774,444 | A | * | 6/1998 | Shimano et al. ........ 369/110.02 |
| 5,786,583 | A | | 7/1998 | Maltsev |
| 5,808,988 | A | * | 9/1998 | Maeda et al. ............ 369/47.17 |
| 5,852,434 | A | | 12/1998 | Sekendur |
| 6,108,436 | A | * | 8/2000 | Jansen et al. ................ 382/112 |
| 6,522,386 | B1 | * | 2/2003 | Nishi ........................... 355/52 |

FOREIGN PATENT DOCUMENTS

| WO | 9820446 | 5/1998 |
| WO | 0126032 | 4/2001 |

* cited by examiner

*Primary Examiner*—Bhavesh M. Mehta
*Assistant Examiner*—Sheela Chawan
(74) *Attorney, Agent, or Firm*—Birch, Stewart, Kolasch & Birch, LLP

(57) ABSTRACT

A method aims to identify a virtual raster pattern in an image of a surface that is provided with a plurality of position-coding marks. Each mark is associated with a respective intersection of raster lines belonging to the raster pattern. By means of the method, the virtual raster pattern is identified via Fourier analysis of the image. A computer program product and a device for position determination are also described.

65 Claims, 8 Drawing Sheets

IDENTIFICATION OF VIRTUAL RASTER PATTERN

This application claims the benefit of provisional applications 60/210,647 and 60/261,123, filed Jun. 9, 2000 and Jan. 12, 2001 respectively.

TECHNICAL FIELD

The present invention relates in general to identification of raster patterns, in particular in connection with position coding on a surface that is provided with a plurality of position-coding marks. In particular, the invention relates to identification of a virtual raster pattern in an image of this surface, on which each mark is associated with a respective intersection of raster lines belonging to the virtual raster pattern.

BACKGROUND ART

In many connections it is desirable to be able to determine an absolute position on a surface. One example is the digitizing of drawings. Another example is the production of an electronic version of handwritten information.

Examples of previously known devices for position determination are found in U.S. Pat. No. 5,852,434, where a device for determining an absolute position is described. The device comprises a writing surface which is provided with a position-coding pattern by means of which x-y-coordinates can be determined, a detector that can detect the position-coding pattern and a processor that can determine the position of the detector in relation to the writing surface on the basis of the detected position-coding pattern. The device makes it possible for a user to enter handwritten and hand-drawn information into a computer while the information is being written or drawn on the writing surface.

Three examples of position coding are given in U.S. Pat. No. 5,852,434. The first example consists of symbols, each of which is constructed of three concentric circles. The outermost circle represents the x-coordinate and the middle the y-coordinate. Both the outer circles are further divided into 16 parts which, depending upon whether they are filled in or not, indicate different numbers. This means that each pair of coordinates, x, y, is coded by a complex symbol with a special appearance.

In the second example, the coordinates in each point on the writing surface are indicated by means of a bar code stack, a bar code for the x-coordinate being indicated above a bar code for the y-coordinate.

A third example consists of a checked pattern that can be used to code the x- and y-coordinates. There is, however, no explanation as to how the checked pattern is constructed or how it can be converted into coordinates.

A problem with the position-coding pattern of U.S. Pat. No. 5,852,434 is that it is constructed of complex symbols and the smaller the symbols are made, the more difficult it becomes to produce the patterned writing surface and the greater the danger of incorrect position determinations, while the larger the symbols are made, the poorer the position resolution becomes.

A further problem is that the processing of the detected position-coding pattern by the processor becomes rather complicated, due to the fact that complex symbols are to be interpreted.

Yet another problem is that the sensor must be designed in such a way that it can record four symbols at the same time, so that it is certain to include at least one symbol in its entirety, which is necessary in order for the position determination to be carried out. The ratio between the required sensor area and the area of the position-coding pattern that defines a position is thus large.

In the international Patent Application PCT/SE00/01895, which is assigned to the present Applicant, a position code is described which solves the above-mentioned problems. The position code consists of a raster and marks which are positioned at each raster point. The marks are preferably essentially the same size, round and displaced in relation to the raster points in one of four orthogonal directions. The raster is virtual and is thus invisible both to the eye and to sensors.

In order to decode the above-mentioned position code, it is necessary for the virtual raster to be identified. The identification of the raster is the object of the present invention.

SUMMARY OF THE INVENTION

The object of the present invention is thus to indicate a method for identifying a virtual raster pattern in an image of the type described by way of introduction.

A special object is to make possible the identification of a regular virtual raster pattern in an image that is recorded with an unknown rotation and/or an unknown perspective between the imaging sensor and the imaged surface.

These and other objects which will be apparent from the following description are achieved completely or partially by a method according to claims 1 and 26, a computer program product according to claim 27 and a device for position determination according to claim 28. Preferred embodiments are defined in the subclaims.

According to the invention, some form of Fourier analysis is used for identification of the virtual raster pattern. This provides a plurality of important advantages. During the Fourier analysis, the whole image or a subset thereof is processed as a single unit. In this way identification can be implemented with low sensitivity to local interference, for example noise in the image or dirt on the imaged surface. The use of Fourier analysis also makes possible effective and unambiguous compensation for an unknown rotation and/or an unknown perspective between the imaging sensor and the imaged surface.

The above-mentioned Fourier analysis comprises classical Fourier analysis, which, however, is normally very calculation-intensive and is often replaced by FFT, Fast Fourier Transformation, which can also be used in the present invention.

According to a preferred embodiment, before the Fourier analysis of the image, a conversion is carried out of the image into a set of discrete unit pulses that are placed at the positions of the marks in the image. Thus a classical Fourier analysis can be used, which is simplified as far as calculation is concerned. A double integral is thereby replaced by a sum of the discrete unit pulses, whereby the number of operations required is reduced. The identification via Fourier analysis can thus be implemented in an efficient way, as far as calculation is concerned, and can be implemented in a rapid program code which can be executed in real time by a processor that draws little current.

Each unit pulse is preferably placed at the center of gravity of the corresponding mark. This means that each mark corresponds to a single location which is unambiguous and essentially independent of the shape of the mark. This minimizes the effect of blur in the image caused by movement or the image not being in the focus of the optical system.

According to a preferred embodiment, the Fourier analysis comprises the steps of calculating a spatial frequency spectrum in two dimensions on the basis of the image, of identifying at least two main vectors in the image, based on the frequency spectrum, and identifying the raster lines of the raster pattern on the basis of the main vectors. The main vectors resulting from the Fourier analysis represent the dominant directions in the image, in particular the perpendiculars to the directions of the raster lines, and the lengths of the main vectors correspond to the image's dominant spatial frequencies along the main vectors. In an orthogonal uniform raster pattern, the main vectors are thus two mutually orthogonal vectors with a length corresponding to the distances between the raster lines.

It should be noted that within the scope of the invention, the term "spatial frequency spectrum" also comprises its inverse, that is a "spatial wavelength spectrum".

It is preferable for the spatial frequency spectrum to be calculated on the basis of a central part of the image. The adverse effect of any perspective in the image is thereby minimized. If the image contains a perspective, the spatial frequencies will vary across the image, and in particular in the peripheral parts thereof. In addition, the calculation time is reduced, since a subset of the image is evaluated. In certain cases, the choice of the central part also results in lower requirements concerning image quality and/or illumination of the surface that is being imaged.

According to a preferred embodiment, the main vectors are identified by localizing in the spatial frequency spectrum positions of peaks that exceed a given threshold value, and selecting main vectors on the basis of these positions.

It should also be noted that, even if it is possible, it is not necessary to calculate a complete spatial frequency spectrum in two dimensions, that is for all possible directions and spatial frequencies in the image. The spatial frequency spectrum is calculated or "sampled", however, preferably based on a two-dimensional Fourier transform along at least two directions in the image.

According to an additional preferred embodiment, the calculation of the spatial frequency spectrum and identification of the main vectors therein are carried out by changing the direction of a direction vector in steps within an angle range, calculating at least one absolute value of the two-dimensional Fourier transform for the image on the basis of each such direction vector, and identifying the absolute values that exceed said threshold value. The angle range, which is typically 180° or less since a larger angle range results in redundant information, is searched typically in steps of approx. 2°–4°, although smaller or larger steps can be used in certain applications. The threshold value is typically 30–70% of the theoretical maximum absolute value, which is proportional to the number of marks in the subset of the image that is subjected to the Fourier analysis. The maximum absolute value can thus be calculated for each subset.

It is preferable that, while searching through the angle range, the length of the direction vector is changed within a frequency range that comprises the nominal spatial frequency of the raster pattern, that is the spatial frequency of the raster pattern on the imaged surface. The frequency range is suitably selected so that it contains all possible spatial frequencies that can arise as a result of the imaging relationship (rotation/perspective) between the imaging sensor and the imaged surface. For an image in the form of a set of unit pulses, the calculation of the Fourier transform for each new length of a given direction vector involves only one extra addition step, which can be carried out in a way that is efficient as far as calculation is concerned. The length of the direction vector is preferably changed in steps that are inversely proportional to some suitable power of 2, for example eighths ($2^{-3}$), as the step length can then be calculated by a time-efficient bit shift. It is possible that the stepwise change of the length of the direction vector is discontinued upon the identification of one or more absolute values that exceed the threshold value, and that the direction of the direction vector is changed within the angle range for calculation of a new absolute value of the two-dimensional Fourier transform.

The position of each of the peaks is suitably localized by calculation of the center of gravity of the absolute values that exceed the threshold value and that are adjacent to each other in the spatial frequency spectrum. This provides a relatively accurate position determination for the peaks, even with coarse searching of the angle range.

According to a preferred embodiment, the partial step of selecting at least two main vectors comprises having each peak position identify a candidate vector, having at least one current image transform, which provides a given change in the relationship between two vectors, operate on the candidate vectors, and selecting as main vectors the candidate vectors that attain a required mutual relationship for said at least one current image transform. This partial step is implemented in order to establish which of the localized peak positions represent main vectors. The peak positions can, in addition to main vectors, represent second order dominant patterns in the image, for example, diagonal patterns, or patterns resulting from interference/noise.

The image transform is suitably a transform, for example elliptical, that changes both the length ratio and the angle ratio between the vectors. In this case, the required mutual relationship is a length and angle ratio which corresponds to the relationship between the raster lines in the original raster pattern, that is the virtual raster pattern on the imaged surface. For example, if the original raster pattern is an orthogonal uniform raster pattern, the image transform should thus transform the main vectors to an orthogonal angle ratio with the length ratio 1:1. If one of the candidate vectors corresponds to a diagonal direction in the image, then the angle ratio should thus be 45° and the length ratio should be $1:\sqrt{2}$.

It is possible to have a series of different current image transforms operate sequentially on the candidate vectors, at least until a required mutual relationship is obtained between the candidate vectors. Alternatively, the current image transform can be selected adaptively, more particularly on the basis of an earlier image transform that gave rise to the required relationship for a previous image.

It is preferable that each current image transform corresponds to a given imaging relationship between the imaging sensor and the imaged surface. In an embodiment that is very efficient as far as calculation is concerned but is relatively inaccurate, the imaging relationship is derived by finding which image transform gives rise to the required relationship between the candidate vectors, whereby rotation and perspective in the image are minimized on the basis of this imaging relationship.

According to an alternative embodiment, the main vectors are selected instead on the basis of earlier main vectors which were determined for a previous image. It is possible to make the main vectors identical to the earlier main vectors, or to use weighted information about these earlier main vectors during the identification of the main vectors, for example in order to make the localization of peaks in the spatial frequency spectrum more effective.

According to a preferred embodiment, the marks are transformed with the identified main vectors as the bases for the production of a rotation-corrected image in which rotation of the marks over the plane of the image is essentially eliminated.

According to a further preferred embodiment, a compensation for the perspective is effected in the thus rotation-corrected image. This compensation can be preceded by a needs test, in which the width is determined of the peaks corresponding to the main vectors in a spatial frequency spectrum of said rotation-corrected image. If the width exceeds a given width value, perspective compensation is carried out. The width of the peaks can be determined in a way that is efficient as far as calculation is concerned, since the positions of the peaks in the spatial frequency spectrum are essentially known from preceding processing steps.

The perspective compensation suitably comprises measuring an inclination variation for the raster pattern along each main vector in the rotation-corrected image, calculating a perspective transform that essentially eliminates the inclination variation on the basis of the measured inclination variation, and producing a perspective-corrected image by means of the perspective transform. This is an efficient way to calculate a perspective-corrected image with a high degree of accuracy.

In this connection, it is preferable that the measurement of the inclination variation for the raster pattern along a selected main vector comprises, via Fourier analysis of at least two subsets of the rotation-corrected image distributed along the selected main vector, calculating at least one subset main vector for each subset, identifying an initial position in the associated subset for each subset main vector, and calculating the inclination variation along the selected main vector on the basis of the subset main vectors and the initial positions. The identification of the subset main vectors via Fourier analysis can be achieved quickly by starting from the known main vectors. In general, the subset main vectors are situated close to the main vectors.

The initial position is preferably identified on the basis of the center of gravity of the marks incorporated in the respective subset. This means that the identification of the initial position is only affected to a small extent by imaging errors, such as high degree of perspective, missing marks, additional marks, noise, etc. Alternatively, the initial position could be set as the mid-point of the subset, whereby the calculations required are minimized.

A further preferred embodiment comprises the steps of measuring the phase displacement along the respective main vector via Fourier analysis of the rotation-corrected or perspective-corrected image, and on the basis of the measured phase displacements localizing the raster pattern relative to the marks in the image. The phase displacement is suitably obtained as the phase angle for the two-dimensional Fourier transform of the image for the main vectors and can easily be eliminated by a transformation operation. The directions of the raster lines are then given by the perpendiculars to the main vectors, and the distance between the intersections of the raster lines along the main vectors is given by the lengths of the main vectors.

In certain cases, it is desirable to calculate a normalizing transform that places the intersections of the raster pattern a given distance apart, for example, at integer coordinates, and to operate the normalizing transform on the image in order to produce a normalized image.

According to another aspect of the present invention, this relates to a computer-readable computer program product which comprises a computer program with instructions for causing the computer to implement the method for identification as described above. This computer program product can, for example, comprise a non-volatile memory for a computer, such as a floppy disk or CD ROM, or a volatile memory in a computer. The computer program product can alternatively comprise propagating signals, such as a bit stream for packet transfer via the Internet or the like, or carrier waves that are transmitted to the computer by cable-based or wireless means.

According to a further aspect of the present invention, this relates to a device for position determination. The device comprises a sensor for producing an image of a partial surface of a surface which is provided with a position code in the form of a plurality of marks, each of which is associated with one of a plurality of intersections belonging to a virtual raster pattern, and an image-processing means which is arranged to calculate a position for the partial surface based on a subset of the surface. The image-processing means is thereby designed to identify the virtual raster pattern in accordance with the method above.

The advantages of the computer program product and the device for position determination are apparent from the above description. The features described in association with the method for identifying a virtual raster pattern are, of course, also applicable to the device for position determination.

BRIEF DESCRIPTION OF THE DRAWINGS

In the following, the invention will be described for the purpose of exemplification with reference to the accompanying drawings which show a currently preferred embodiment and are summarized below.

DESCRIPTION OF PREFERRED EMBODIMENTS

Figure 1A:
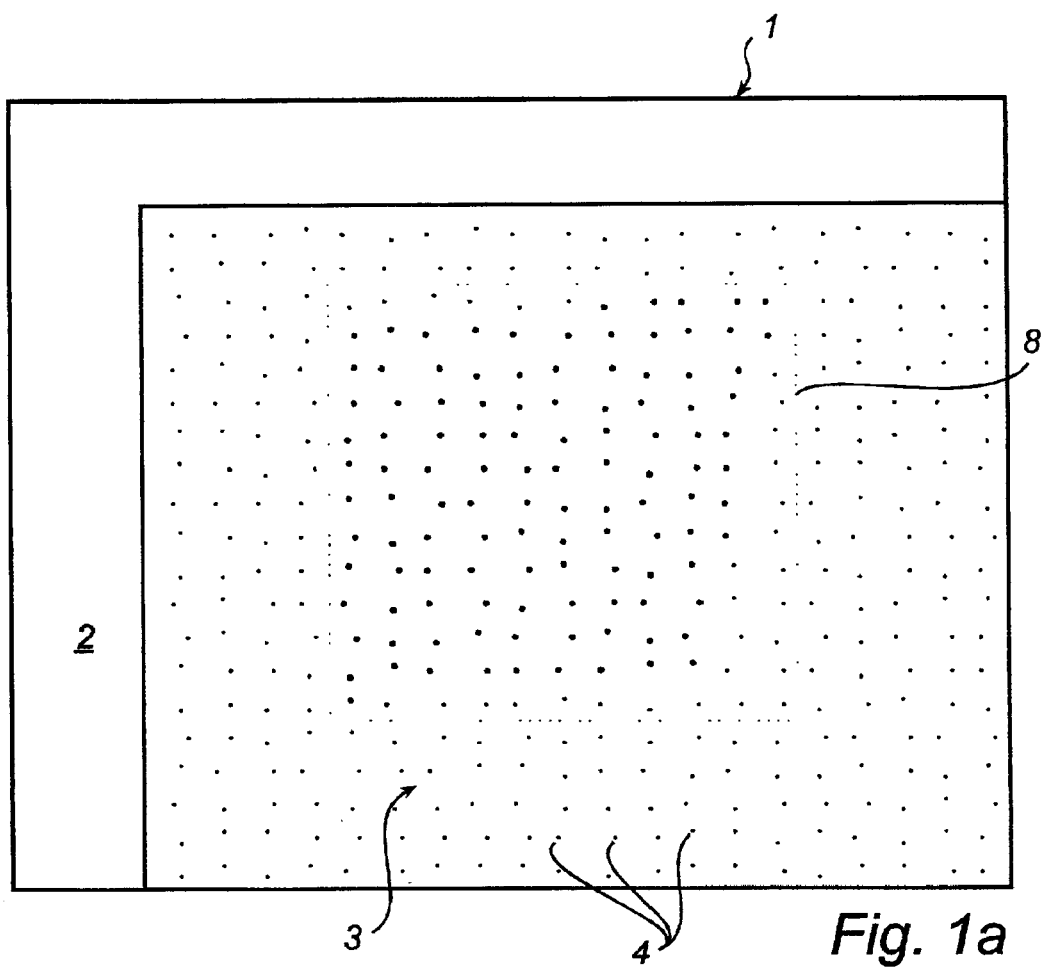
FIGS. 1A–1B show an example of a surface with a position-coding pattern and an image of the same respectively.

FIG. 1a shows a part of a product 1 which on at least part of its surface 2 is provided with an optically readable position-coding pattern 3 which makes possible position determination. The position-coding pattern 3 comprises marks 4 which are systematically arranged across the surface, so that this has a "patterned" appearance. The position determination can be carried out on the whole surface of the product. In other cases, the surface that permits position determination can constitute a smaller part of the product. The product can, for example, be used to produce an electronic representation of information that is written or drawn on the surface. The electronic representation can be produced by determining the position of a pen on the paper continually while writing on the surface with the pen, by reading off the position-coding pattern.

Figure 9:
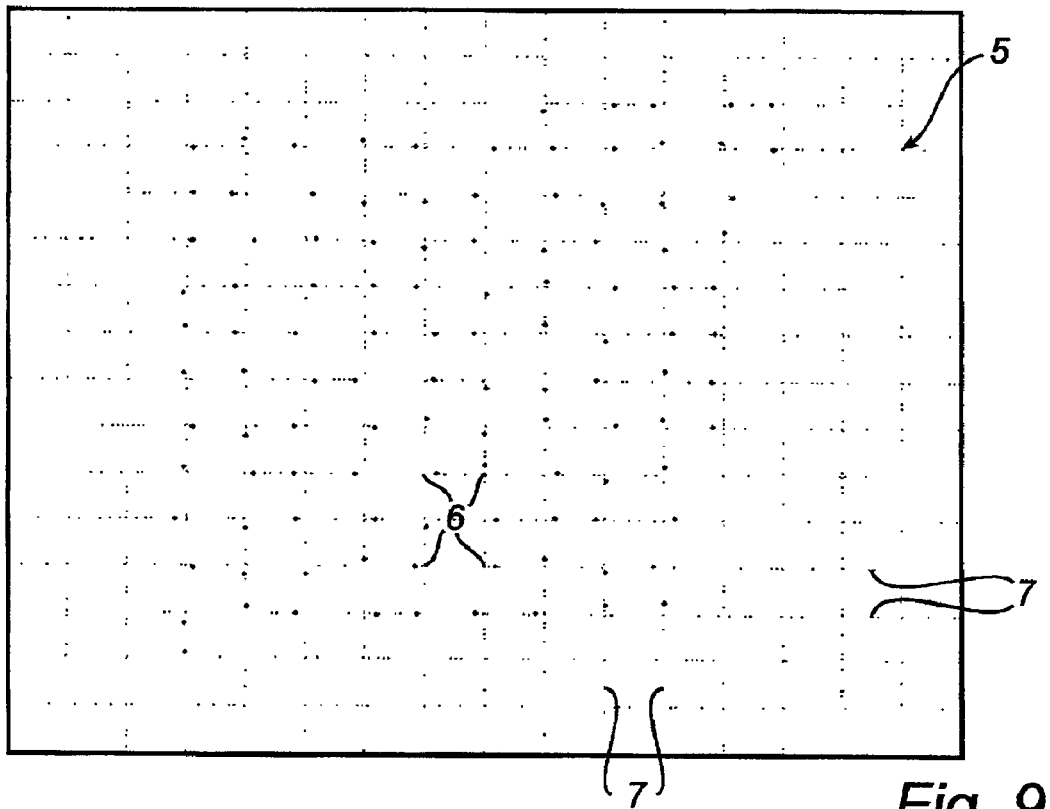
FIG. 9 shows the image according to FIG. 7 after compensation for displacement along the main vectors, the original orthogonal raster pattern being identified.

More particularly, the position-coding pattern comprises a virtual raster 5 (indicated by broken lines in FIG. 9), which is neither visible to the human eye nor can be detected directly by a device for determining positions on the surface, and the marks 4, each of which represents one of four values dependent upon its location. The value of a mark 4 depends upon its location in relation to its nominal position 6 (FIG. 9), which can also be called its virtual raster point and is represented by the intersection between the raster lines 7 (FIG. 9). The mark 4 is the shape of a circular dot. In the example in FIG. 9 there are four possible locations, one on each of the raster lines 7 extending from the nominal position 6. The displacement from the nominal position 6 is the same size for all values. In this case, the virtual raster 5 is orthogonal and has the same pitch in both its main directions or raster directions. In this connection it should be pointed out that the position-coding pattern in FIG. 1A and FIG. 9 have been greatly enlarged for the sake of clarity. In addition, it is shown on only a part of the product.

For details concerning the generation of the position-coding pattern and the decoding of the same for position determination, reference is made to the Applicant's Swedish Patent Application PCT/SE00/01895.

Figure 1B:
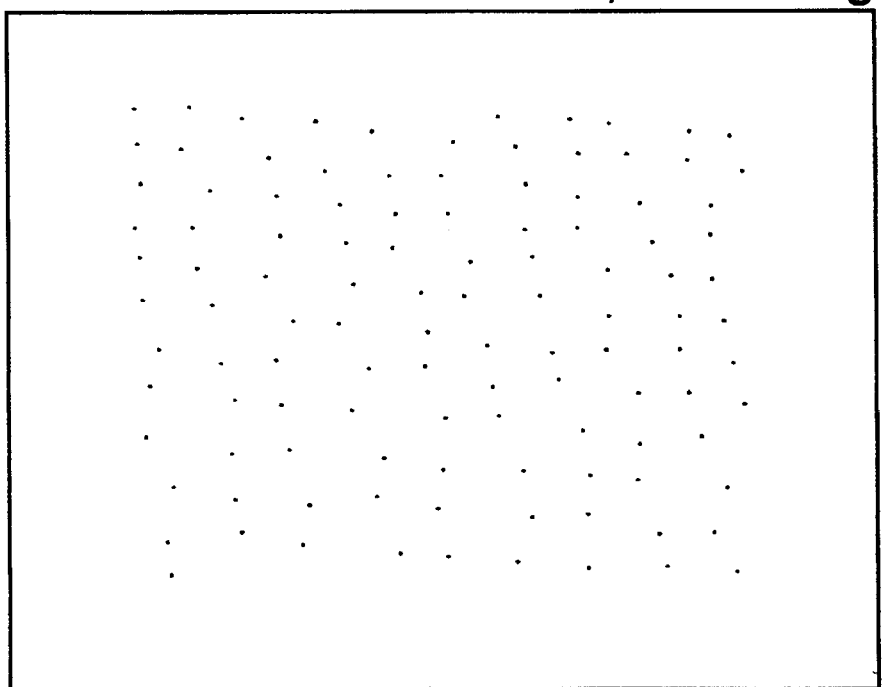

In order for the position code to be able to be detected, the virtual raster needs to be determined. This must be carried out with high accuracy and in real time, based on an image of a partial surface with a number of marks 4. FIG. 1B shows such an image of the partial surface 8 in FIG. 1A. For the sake of clarity, the imaged marks are somewhat larger than the other marks in FIG. 1A. In the image according to FIG. 1B the pattern is distorted due to the sensor not being held parallel with the imaged partial surface. The image therefore contains both an unknown perspective, due to tilting of the sensor relative to the partial surface, and an unknown rotation in the image plane, due to rotating or skewing of the sensor around its perpendicular axis.

Figure 2:
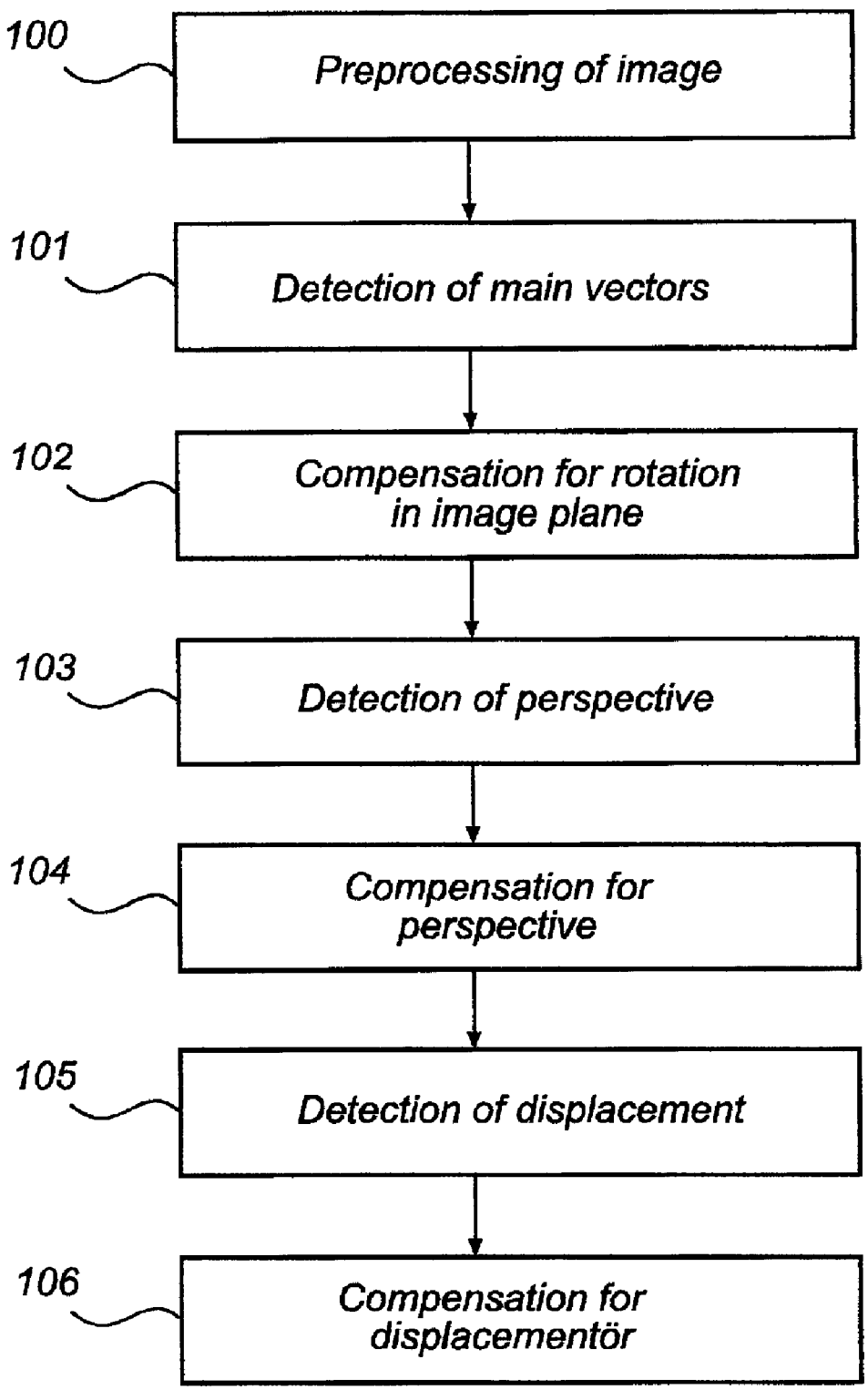
FIG. 2 illustrates some of the processing steps that are implemented for identification of the virtual raster pattern in the image according to FIG. 1B.

FIG. 2 indicates the main steps for the recreation of the original dot pattern and identification of the virtual raster based on a recorded image. The main steps comprise preprocessing of the image (step 100), detection of the image's main vectors via Fourier analysis (step 101), compensation for rotation in the image plane by projection of the marks along the main vectors (step 102), detection of the perspective in the rotation-corrected image via Fourier analysis (step 103), removal of the detected perspective by transformation (step 104), detection of the phase content in the perspective-corrected image via Fourier analysis (step 105) and finally removal of the phase content by transformation to produce a recreated dot pattern with the associated virtual raster (step 106).

In the following, each of the main steps will be described in greater detail.

Preprocessing (Step 100)

The aim of the preprocessing is to identify all the marks 4 in the image. This can be carried out using thresholds, so that a mark is identified by one or more picture elements (pixels) with a value that exceeds a predetermined or calculated threshold value. The center of gravity is calculated for all such picture elements belonging to a mark and is used in the subsequent processing. Thus, the appearance of the mark in the image has as little effect as possible on the mark's subsequently calculated displacement from the nominal position. The image is then converted to a set of dots by the marks being replaced by unit pulses (so-called Dirac pulses, $\delta$) which are placed at the centers of gravity of the marks.

When the set of dots has been defined, a number of partial steps are implemented that are based on Fourier analysis of the image, or rather the above-mentioned set of dots.

The general two-dimensional Fourier transform of an image f(x,y) is of the form:

$$F(u, v) = \iint\limits_{\text{image}} f(x, y) \cdot e^{-2\pi \cdot i \cdot (ux+vy)}$$

Since the image is converted to a set of dots, the Fourier transform is given by the expression:

$$F(u, v) = \iint\limits_{\text{image}} \delta(x - x_j, y - y_k) \cdot e^{-2\pi \cdot i \cdot (ux+vy)}$$

$$= \sum_{j,k} e^{-2\pi \cdot i \cdot (u \cdot x_j + v \cdot y_k)}$$

where the set of dots is $\{x_j, y_k\}$, and (u,v) is a direction vector, since the integral of a Dirac pulse is one (1), and the image function between the Dirac pulses is zero (0).

This expression can be calculated relatively quickly, as the number of operations is only equal to the number of detected dots, that is normally of the order of 100.

Detection of Main Vectors (Step 101)

After the preprocessing of the image, the set of dots is analyzed to detect its main or raster vectors, that is its dominant directions and dominant spatial frequencies. This is carried out by the calculation of the Fourier transform of the set of dots for different direction vectors (u,v). The absolute values of the calculated Fourier transforms $|F(u,v)|$ give a spatial frequency spectrum in two dimensions.

Figure 3:
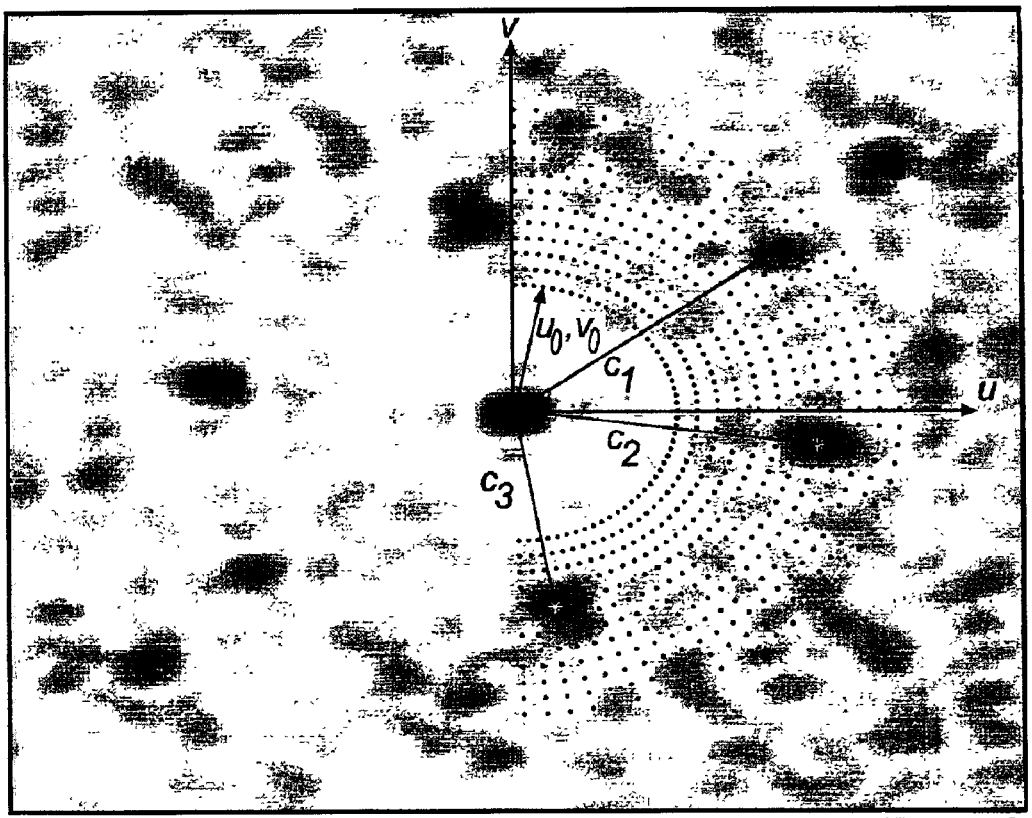
FIG. 3 shows the two-dimensional Fourier transform of the image according to FIG. 1B, with the actual calculation dots marked by black symbols.

FIG. 3 shows a spatial frequency spectrum for the set of dots in FIG. 1b. Dark areas indicate higher spectral amplitudes. The central dark area forms the origin, that is (u,v)=(0,0). Instead of calculating the whole two-dimensional frequency spectrum as shown in FIG. 3, the Fourier transform is calculated at a number of dots, that is for a number of different direction vectors (u,v). These dots are marked in FIG. 3. More particularly, a band-shaped area in a half plane of the frequency domain is "swept" in steps. Several sums are calculated along one and the same search direction. With the aim of making the calculations more efficient, only scaling is carried out along the search direction, and the scalar product $(u_0 \cdot x_j + v_0 \cdot y_k)$ is calculated only once per direction vector $(u_0, v_0)$. The scaling is carried out iteratively and gives rise to only one extra addition per step and dot in each search direction.

In pseudo-code this can be written:

```
for dot=1 to N
    α0=u0·dot.x+v0·dot.y
    dα0=α0/8
    for s=0 to 11
        dsum=exp (−2·π·i·α0)
        sum(s) = sum(s) + dsum
        α0=α0+dα0
    next s
next dot
```

In each search direction, steps can suitably be used that are inversely proportional to any suitable power of 2 ($2^n$), for example, eighths as above, as the calculation of the step ($d\alpha_0$) is thereby reduced to a bit shift that is efficient as far as calculation is concerned.

The width of the search band in the frequency plane is determined based on how much the imaging distortion can be assumed to change the spatial frequencies of the original pattern (FIG. 1A) along the main vectors. This depends in turn upon in what locations the imaging sensor can be expected to be placed. Normally the search band extends on both sides of the pattern's nominal spatial frequencies, that is the distance between the raster lines in the original pattern. Of course, the size of the steps in each search direction and the steps in the sweep direction varies depending upon available processor power, required calculation time and required accuracy.

From the above, it can be seen that the searching in the frequency plane is carried out by the calculation of a number of independent sums. The searching is thus of a parallel nature and is therefore well suited for implementation in hardware, such as an ASIC.

After or during the calculation of this "sampled" spatial frequency spectrum in two dimensions, candidate vectors c1–c3 are identified, based on the values of the calculation dots. All calculation dots with a value above a threshold value are considered to be significant (marked with black crosses in FIG. 3) and are used for the calculation of the coordinates for the candidate vectors c1–c3. The threshold value is determined as a percentage, for example 50%, of the theoretically maximum amplitude value, which is proportional to the number of marks in the image. The number of marks is known from the preprocessing step. If several significant calculation dots are adjacent to each other in the frequency plane, the center of gravity of these is considered to give the coordinate for a candidate vector c1–c3 in the frequency plane (candidate vectors which later prove to be main vectors or diagonal vectors are marked by white and black stars respectively in FIG. 3).

It must be pointed out that all dots in the set of dots are not used for the above calculation, but only those that are closest to the center of the image. Typically, approximately 50% of the available dots are used. This is done principally for two reasons. If all the dots were to be included, there is a danger that the peaks in the frequency plane (FIG. 3) would become too wide, and thereby difficult to detect, particularly with a high degree of perspective. This is because the perspective gives rise to great frequency changes in peripheral parts of the image. At the center of the image, however, the spatial frequencies correspond relatively well to the spatial average frequencies in the image. In addition, the problem is avoided of insufficient illumination of the periphery of the image, and the resulting high noise levels. In addition, the calculation time is reduced in proportion to the reduction in the number of dots.

After the above calculation step, a number of peaks have been detected in the frequency plane. However, it remains to be determined which of the detected peaks correspond to main vectors. If the image is recorded without perspective between the sensor and the patterned product, the diagonal vector can be distinguished in that it has a length that is $\sqrt{2}$ times longer than the main vectors, which in addition are orthogonal to each other. This does not apply, however, with more extreme perspectives, such as in FIG. 1B, where the main vectors are not orthogonal, and neither is the length ratio between the diagonal vector and the main vector $\sqrt{2}$. In addition, one or more invalid maximums may have been detected in the frequency plane, for example as a result of interference or noise in the image.

For the identification of main vectors a number of image transforms are used, typically approximately 25, corresponding to a number of given imaging relationships between the sensor and the product. In the case of a pen, this can in fact be physically angled and rotated relative to the product in a limited number of ways. The image transforms restore a given distorted frequency domain to an orthogonal and uniform frequency domain, that is a frequency domain where the main vectors actually are orthogonal and where the length ratio between a diagonal vector and a main vector is $\sqrt{2}$. The image transforms typically give rise to a so-called elliptical transformation.

After identification of the candidate vectors c1–c3, these candidate vectors c1–c3 are operated on by the image transforms and it is measured how well the properties (direction and length) of the transformed candidate vectors appear to correspond to those of the true main vectors.

The above can be implemented by having all the image transforms operate on all candidate vectors c1–c3, by the transformed candidate vectors being allocated ratings based on their mutual relationships, and by the main vectors being identified as the transformed candidate vectors that received the highest ratings. If necessary, the image transform that gave rise to the highest ratings can also be identified.

An alternative which is more efficient as far as calculation is concerned is to divide the calculation into two partial steps. In the first partial step, a sequence of image transforms may operate on all pairs of candidate vectors c1–c3, in order to identify all potential pairs of main vectors and the image transforms that gave rise to these potential pairs. After transformation, potential pairs of main vectors have an orthogonal mutual angle ratio, a mutual length ratio of 1:1 and given lengths. These criteria are of course determined within given tolerances. The criterion that the vectors must have given lengths after transformation is intended to exclude two mutually orthogonal diagonal vectors being mistaken for main vectors. In this first partial step, the operation of different image transforms on a given pair of candidate vectors is suitably discontinued when this given pair is identified as a pair of potential main vectors, whereupon the sequence of image transforms may operate on a new pair of candidate vectors. This reduces the number of operations required. In the second partial step, the image transforms that gave rise to the potential pairs may operate on any additional candidate vectors, whereupon these additional candidate vectors are allocated ratings in accordance with their correspondence with diagonal vectors. The main vectors can then be identified as the pair of candidate vectors that received the highest ratings. The division into two partial steps means that the sometimes relatively calculation-intensive ratings evaluation only needs to be implemented for a small number of pairs of candidate vectors and a small number of image transforms.

According to a further alternative, a sequence of image transforms may operate on all pairs of candidate vectors. If sufficiently high ratings are obtained for a particular image transform, then this is selected, otherwise the next image transform in the sequence is tested.

In this connection, it is possible to test the image transforms adaptively, that is for example on the basis of the user's identity and/or the image transform that was selected for a previous image. It is, in fact, probable that consecutive images have been imaged under similar conditions. One and the same user also probably carries out the imaging in a similar way each time.

It is worth noting that the image transforms and the associated calculations are simple to carry out as only the actual candidate vectors are transformed, and not the whole set of dots. The image transforms can be 2×2 matrices, and the number of operations is thus four per image transform and pair of candidate vectors.

As each image transform corresponds to a known relationship between the sensor and the product, the above detection step provides an indication of how the sensor is held relative to the product. With low accuracy requirements, this information can be used immediately in order to compensate for perspective and rotation in the image. Often, however, a more accurate compensation is required.

According to an alternative procedure, searching for peaks in the frequency plane is not carried out. Instead, an image transform is selected initially that is operated on the set of dots or a subset thereof. Thereafter, the main vectors of the transformed set of dots are identified via Fourier analysis, suitably by the above-mentioned searching for peaks in the frequency plane. If no satisfactory result is obtained, a new image transform is selected, whereupon a new identification of main vectors is implemented via Fourier analysis. This method is, however, relatively calculation-intensive, particularly if the image conditions change frequently between consecutive images. To minimize the number of image transforms that must be tested, the selection of image transform is suitably based on the user's identity and/or the image transform selected for a previous image.

Compensation for Rotation (Step 102)

In order to compensate for rotation of the set of dots in the image plane, the set of dots is projected along the main vectors detected as described above. A set of dots is thereby obtained which is principally aligned, even though there can still remain a non-linear interference in the form of a perspective in the image.

Figure 4:
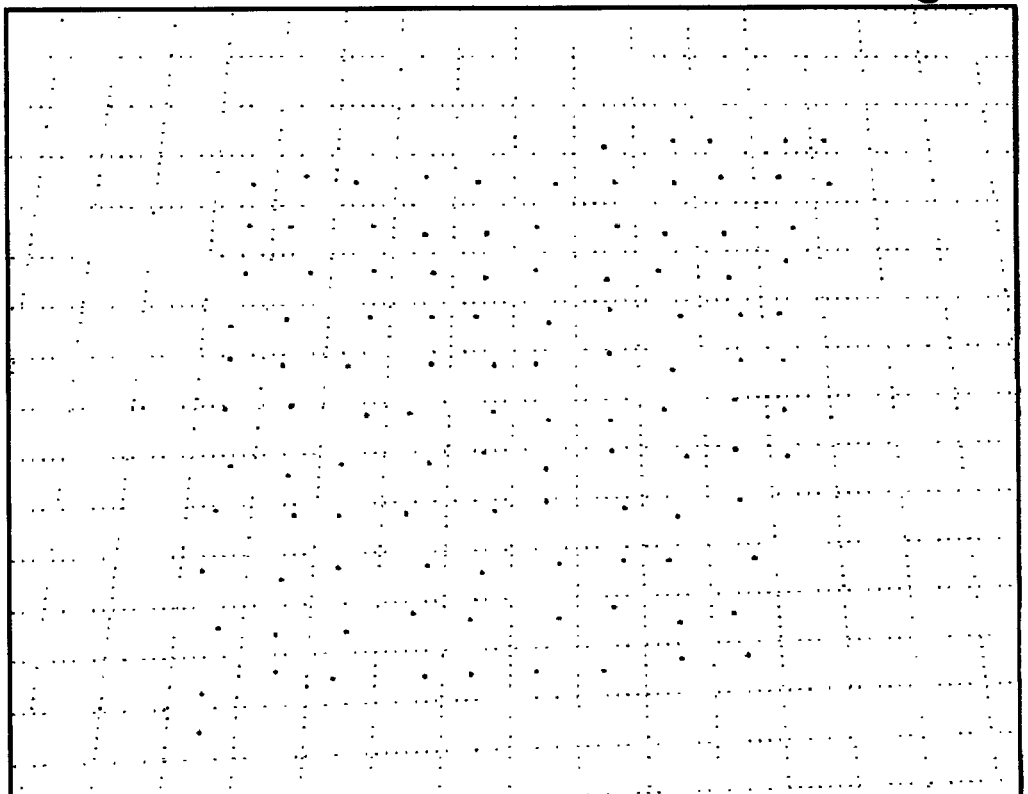
FIG. 4 shows the image according to FIG. 1B after rotation compensation.
Figure 5A:
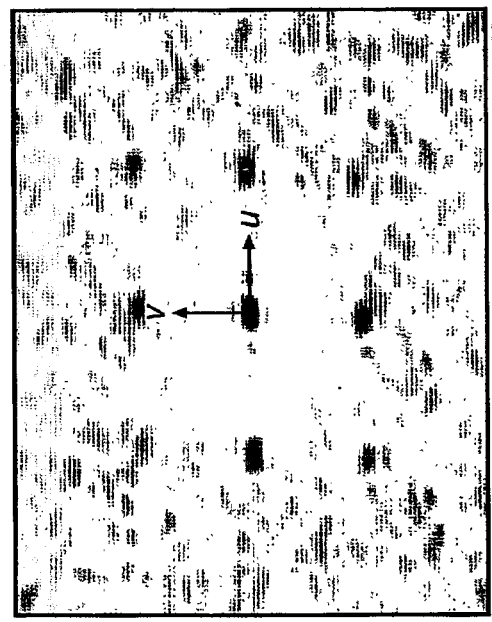
FIGS. 5A–5D show two-dimensional Fourier transforms of subsets of the image according to FIG. 4, with the actual calculation dots marked by black symbols.
Figure 5B:
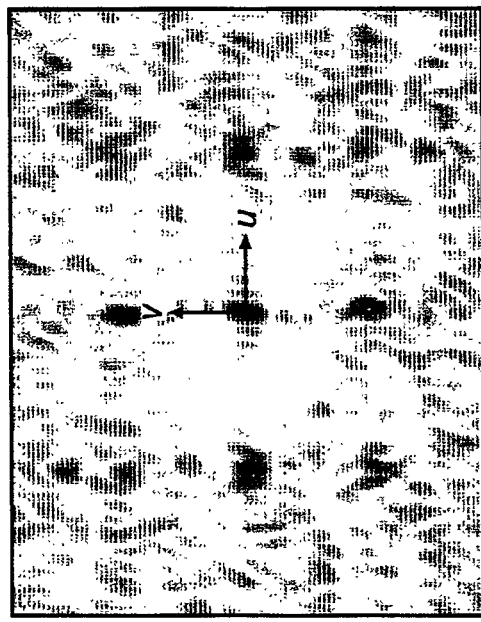
Figure 5C:
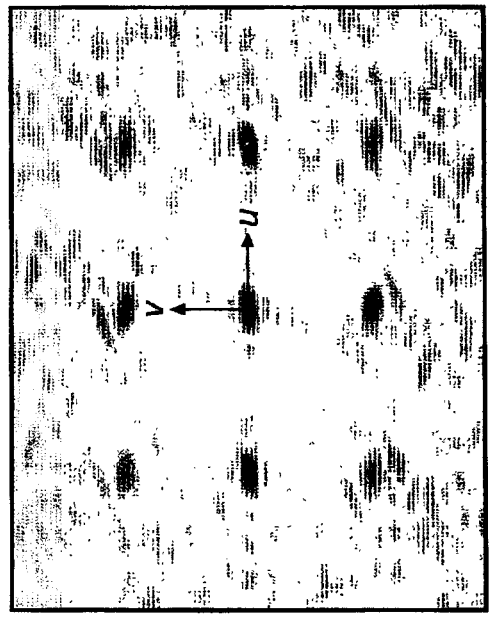
Figure 5D:
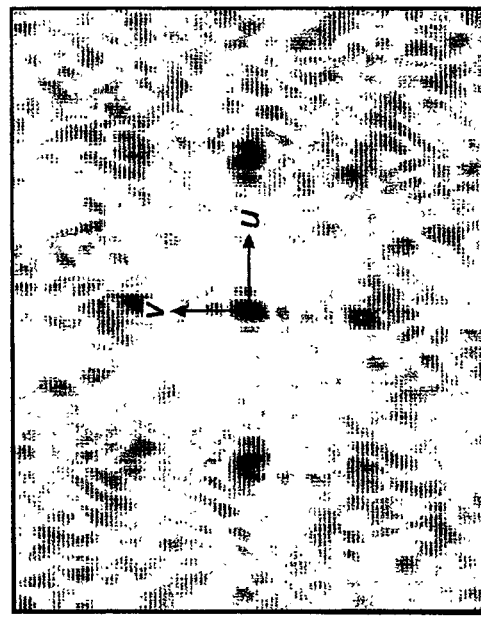

FIG. 4 shows the set of dots in FIG. 1B after such an alignment. In order to show clearly the remaining perspective, the corresponding virtual raster has also been marked by broken lines. It should be noted that this raster has been calculated based on parameters that are determined in the immediately-following detection of perspective (step 103).

Detection of Perspective and Compensation for this (Steps 103–104)

A general characteristic of perspective is that originally straight lines are imaged on lines that converge towards a vanishing point. It can be shown, see Appendix A, that these lines intersect coordinate axes ($x_s$, $y_s$) of the sensor (the image) in such a way that the inclinations of the lines ($\Delta x_s/\Delta y_s$, $\Delta y_s/\Delta x_s$) increase linearly along the respective coordinate axis:

$$\begin{cases} \dfrac{\Delta x_s}{\Delta y_s} = kk_x \cdot x_s + mk_x \\ \dfrac{\Delta y_s}{\Delta x_s} = kk_y \cdot y_s + mk_{y_y} \end{cases}$$

Appendix A also shows that an inclined plane that gives rise to this perspective has a z-coordinate that varies according to the formula:

$$z = C - kk_y \cdot x - kk_x \cdot y,$$

where x, y are spatial coordinates on the inclined plane, that is on the surface of the product, and C is a scaling factor.

In addition, Appendix A shows that perspective can be compensated for by means of the perspective transform:

$$\begin{cases} x = -\dfrac{x_s^t}{1 - kk_x \cdot x_s^t - kk_y \cdot y_s^t} \\ y = -\dfrac{y_s^t}{1 - kk_x \cdot x_s^t - kk_y \cdot y_s^t} \end{cases}$$

where $$\begin{cases} x_s^t = x_s - y_s \cdot mk_x \\ y_s^t = y_s - x_s \cdot mk_y \end{cases}$$

Before this transformation can be carried out, it is thus necessary to measure how the inclination of the raster pattern varies along the main vectors of the rotation-corrected set of dots (corresponding to the coordinate axes $x_s$, $y_s$ above). This inclination variation gives the desired values of $mk_x$, $mk_y$, $kk_x$, $kk_y$.

The inclination variation is measured via Fourier analysis. The set of dots is divided into four subsets around the image's/sensor's horizontal and vertical symmetry axes, the directions of which in practice essentially coincide with the directions of the main vectors. Each subset comprises dots in a half plane: above the horizontal symmetry axis, below the horizontal symmetry axis, to the right of the vertical symmetry axis, to the left of the vertical symmetry axis. Unlike in the above-described detection of main vectors (step 101), the whole set of dots is used here for the division into subsets. The Fourier transform for the respective subsets is calculated in a corresponding way as for the detection of main vectors. The sweeping of the frequency plane is carried out around the main vector and continues until all significant, adjacent peak values have been detected. In a corresponding way as for the detection of the main vectors, the position of the peak is calculated as the center of gravity of all the calculation dots that are adjacent to each other in the frequency plane.

FIGS. 5A–5D show the calculation for the respective half planes: upper (FIG. 5A), lower (FIG. 5B), left (FIG. 5C), right (FIG. 5D), wherein black dots indicate calculation dots without detection of any significant peak value, black crosses indicate calculation dots with detection of a significant peak value, and white stars indicate the centers of gravity for the respective peaks. These centers of gravity define subset main vectors, the direction of which gives the inclination ($\Delta x_s/\Delta y_s$, $\Delta y_s/\Delta x_s$) of the set of dots in the respective half plane. It should be pointed out that a complete frequency spectrum in two dimensions is not calculated. For the sake of clarity it is, however, shown in the background of FIGS. 5A–5D, wherein the central dark area forms the origin, that is (u,v)=(0,0).

Figure 6:
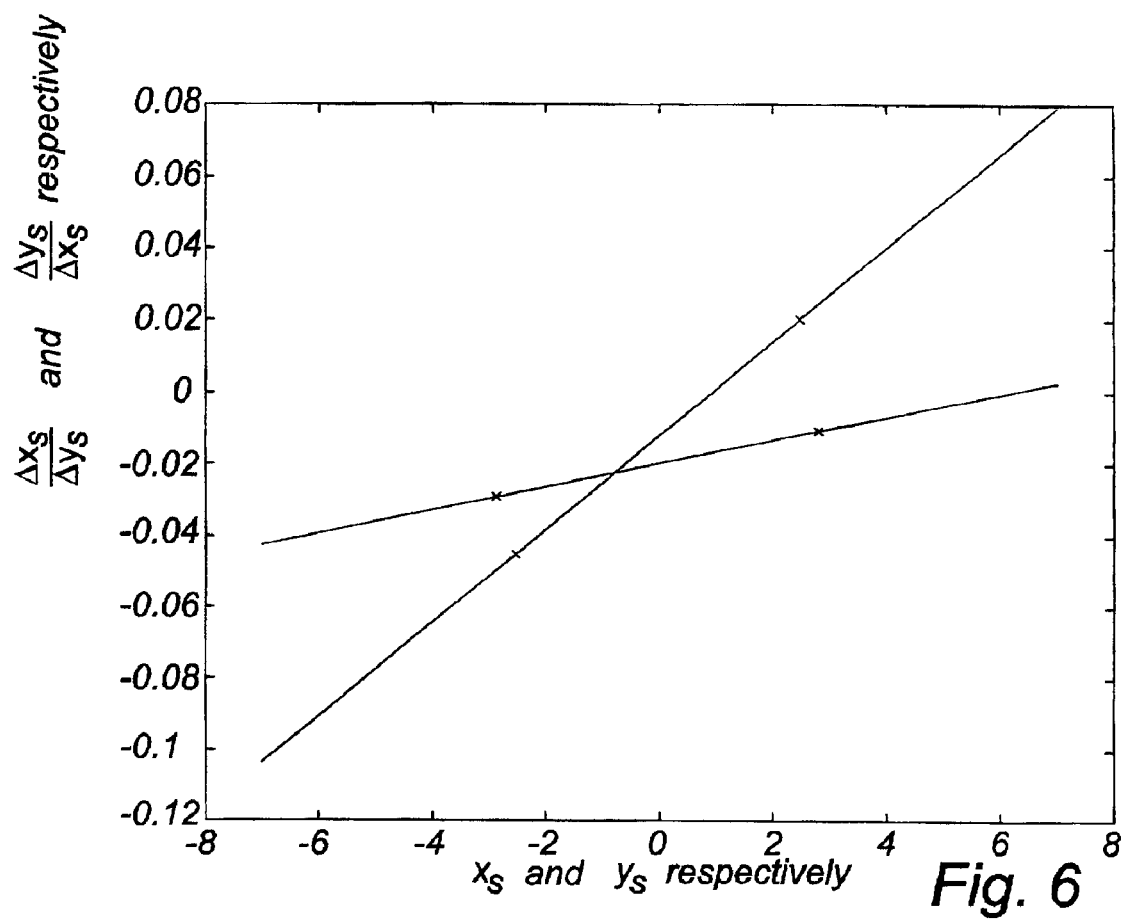
FIG. 6 is a diagram of the calculated inclination variation along two main vectors in the image according to FIG. 4.

For the determination of $mk_x$, $mk_y$, $kk_x$, $kk_y$, initial positions are also calculated for the subset main vectors in the half planes. The initial positions are calculated suitably as the center of gravity of the set of unit pulses in the respective half plane, since the center of gravity is relatively insensitive to variations in the sensor's position, lost dots and a high degree of perspective. It is, however, possible instead to locate the initial position at the geometric center of the respective half plane. For the subset main vectors associated with the left and right half planes, the intersections of the subset main vectors with the horizontal symmetry axis are calculated, and for the subset main vectors associated with the upper and lower half planes, the intersections of the subset main vectors with the vertical symmetry axis are calculated. The inclinations and intersections are fitted to a straight line, from which $mk_x$, $mk_y$, $kk_x$, $kk_y$ are calculated. FIG. 6 shows a diagram of the inclination along a symmetry axis as a function of the position on this symmetry axis. Black crosses indicate the measurement dots that were obtained by the Fourier analysis as above based on the set of dots in FIG. 4.

Figure 7:
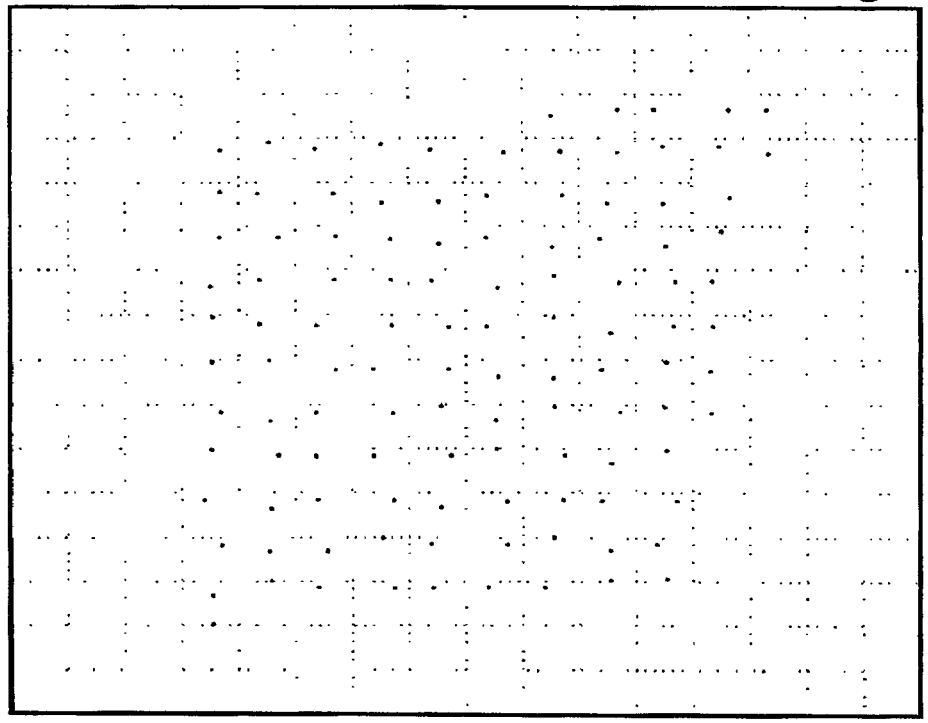
FIG. 7 shows the image according to FIG. 4 after elimination of perspective.

When $mk_x$, $mk_y$, $kk_x$, $kk_y$ are known, a compensation for perspective is implemented via the perspective transform above. FIG. 7 shows the set of dots in FIG. 4 after compensation for perspective. The corresponding virtual raster has also been marked by broken lines.

Of course, it is possible to divide the set of dots into other subsets than those described above for calculation of the inclination variation. More subsets than two per main vector can be used for increased accuracy.

It should also be pointed out that other transforms can be used to compensate for perspective. For example, the above perspective transform can be replaced by the approximating transform:

$$\begin{cases} x = -x_s^t \cdot (1 + kk_x \cdot x_s^t + kk_y \cdot y_s^t) \\ y = -y_s^t \cdot (1 + kk_x \cdot x_s^t + kk_y \cdot y_s^t) \end{cases}$$

The inclination variation of the rotation-compensated image can be measured by other methods than Fourier analysis, for example by line fitting according to the least-squares method. Unlike the Fourier-based method described, which handles the set of dots as a single entity, such line fitting methods require local decisions concerning individual dots, for which reason they are more sensitive to interference.

Detection of Displacement and Compensation for this (Steps 105–106)

After the compensation for perspective, there remains in principle only a constant displacement along the main vectors. As shown in FIG. 7, the raster is otherwise principally straight and essentially free of rotation in the image plane. The displacements can be measured as the phase in the Fourier analysis. What remains is thus to measure this phase and to compensate for it.

Figure 8:
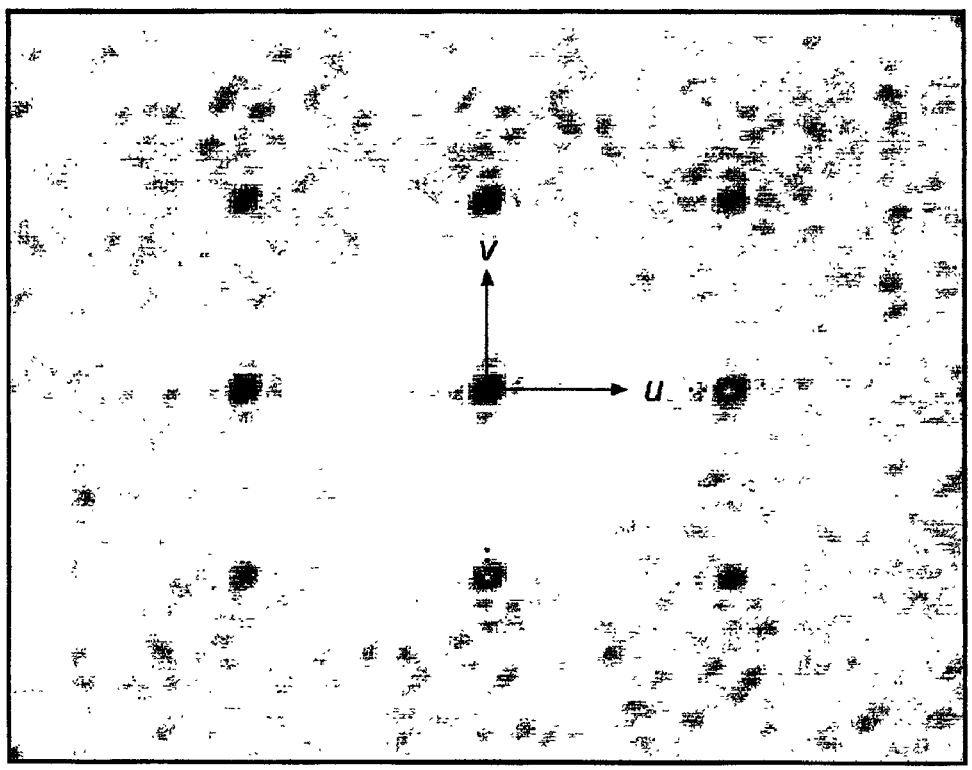
FIG. 8 shows a two-dimensional Fourier transform of the image according to FIG. 7, with the actual calculation dots marked by symbols.

The Fourier transform for the whole set of dots is calculated in a corresponding way to that for the detection of main vectors. The sweeping of the frequency plane is carried out around the main vectors that were identified in step 101 above and continues until all significant adjacent peak values have been detected. In a corresponding way to that for the detection of the main vectors (step 101), the position of the peak is calculated as the center of gravity of all the calculation dots that are adjacent to each other in the frequency plane. The result for the set of dots in FIG. 7 is shown in FIG. 8, wherein again black dots indicate calculation dots without detection of any significant peak value, black crosses indicate calculation dots with detection of a significant peak value, and white stars indicate the center of gravity of the respective peaks. It should be pointed out that a complete two-dimensional frequency spectrum is not calculated. For the sake of clarity it is, however, shown in the background of FIG. 8, wherein the central dark area forms the origin, that is (u,v)=(0,0). FIG. 8 also shows that the peaks in the frequency plane become narrower after compensation for perspective. The width of the peaks can thus be used to determine whether there is in fact a need for perspective compensation in an image.

At the same time as localization of the respective main vector via the absolute value of the Fourier transform, the phase displacement along the respective main vector from the Fourier transform's phase angle is obtained, which is given by the ratio between its real part and its imaginary part. This phase displacement is eliminated by phase transformation of the set of dots, whereupon a new projection is carried out along the most recently determined main vectors. In addition, there is scaling, on the basis of the length of the main vectors, to ensure that the raster is based on integer coordinates.

FIG. 9 shows the re-created image after phase compensation. As shown, the virtual raster 5 is correctly localized relative to the marks/unit pulses, which can now be decoded for position information.

According to an alternative, there is no searching for new main vectors in the frequency plane, since after steps 101–102 these are relatively well-defined. Instead, the phase angles are used for the Fourier transforms which are calculated for the main vectors for the detection of these (step 101).

Optionally, a supplementary fine adjustment of the identified raster pattern can be carried out after the above-mentioned phase compensation. As each mark is a known distance from its nominal position, each sequence of marks along each main vector can be fitted, for example via a least-squares method, to a line, which forms a fine-adjusted raster line.

Device for Position Determination

Figure 10:
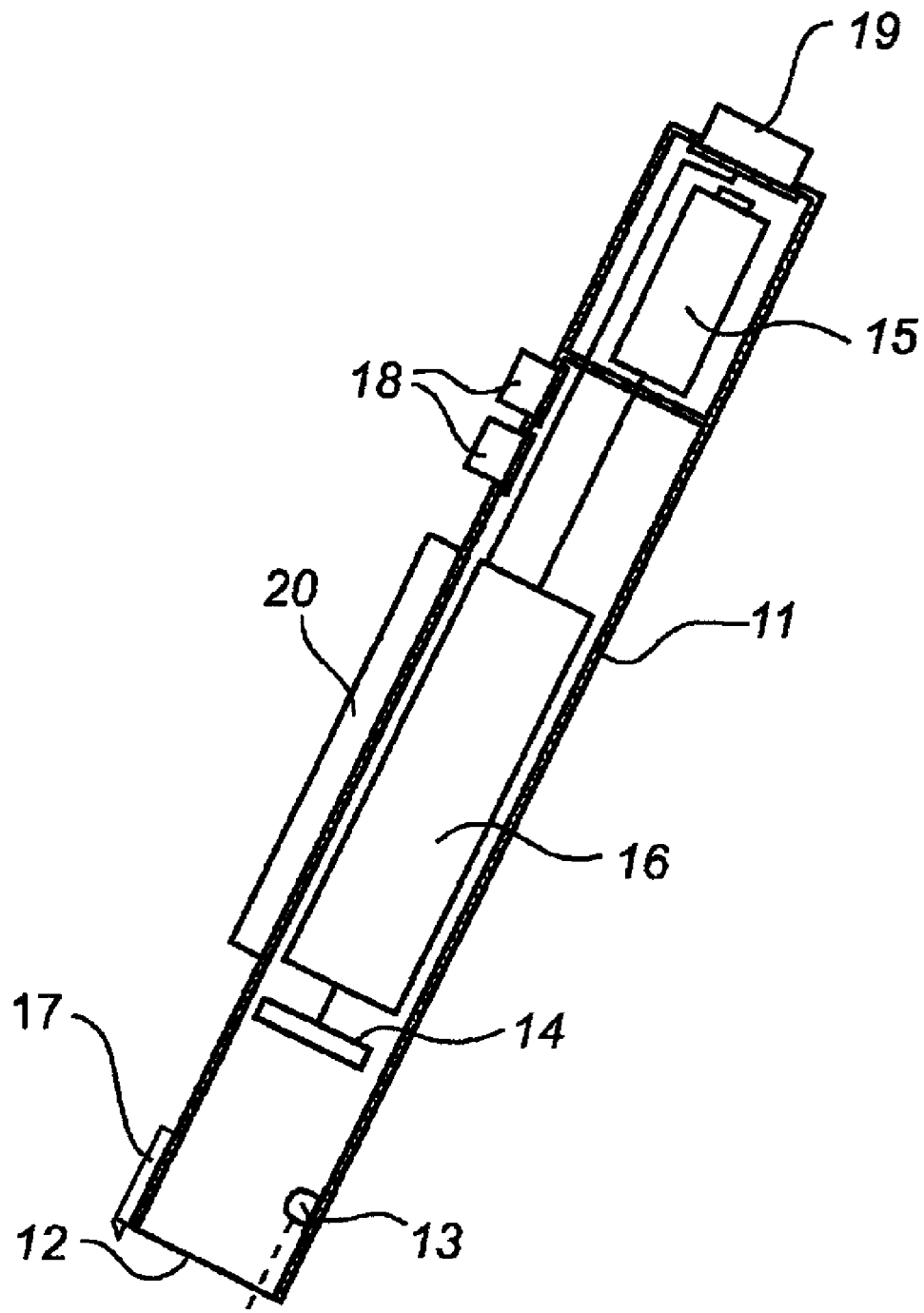
FIG. 10 shows a device that can be used for position determination.

An embodiment of a device for position determination is shown schematically in FIG. 10. It comprises a casing 11 which has approximately the same shape as a pen. In the short side of the casing there is an opening 12. The short side is intended to abut against or to be held a short distance from the surface on which the position determination is to be carried out.

The casing contains principally an optics part, an electronic circuitry part and a power supply.

The optics part comprises at least one light-emitting diode 13 for illuminating the surface which is to be imaged and a light-sensitive area sensor 14, for example a CCD or CMOS sensor, for recording a two-dimensional image. Optionally, the device can also contain an optical system, such as a mirror and/or lens system. The light-emitting diode can be an infrared diode and the sensor can be sensitive to infrared light.

The power supply for the device is obtained from a battery 15, which is mounted in a separate compartment in the casing.

The electronic circuitry part contains an image-processing means 16 for determining a position on the basis of the image recorded by the sensor 14 and in particular a processor unit with a processor which is programmed to read images from the sensor and to carry out position determination on the basis of these images.

In this embodiment, the device also comprises a pen point 17, with the aid of which ordinary pigment-based writing can be written on the surface on which the position determination is to be carried out. The pen point 17 can be extendable and retractable so that the user can control whether or not it is to be used. In certain applications the device does not need to have a pen point at all.

The pigment-based writing is suitably of a type that is transparent to infrared light and the marks suitably absorb infrared light. By using a light-emitting diode which emits infrared light and a sensor which is sensitive to infrared light, the detection of the pattern can be carried out without the above-mentioned writing interfering with the pattern.

The device can also comprise buttons 18, by means of which the device can be activated and controlled. It has also a transceiver 19 for wireless transmission, for example using infrared light, radio waves or ultrasound, of information to and from the device. The device can also comprise a display 20 for displaying positions or recorded information.

A device for recording text is described in the Applicant's Swedish Patent No. 9604008-4. This device can be used for position determination if it is programmed in a suitable way. If it is to be used for pigment-based writing, then it must also be given a pen point.

The device can be divided between different physical casings, a first casing containing components which are required for recording images of the position-coding pattern and for transmitting these to components which are contained in a second casing and which carry out the position determination on the basis of the recorded image or images.

As mentioned, the position determination is carried out by a processor which thus must have software for locating marks in an image and decoding them and for determining positions from the codes thus obtained. Based on the example above, a person skilled in the art will be able to design software which carries out the above-mentioned identification of the virtual raster pattern on the basis of an image of a part of a position-coding pattern.

The device is preferably specified to be used with imaging conditions that lie within given limits. The imaging conditions can be defined as a permitted inclination or tilting of the device (the sensor 14) relative to the surface that is to be imaged, for example a maximum of approximately 60°, and also a permitted rotation or skewing of the device around its longitudinal axis, for example in a range approximately ±30° relative to a reference position.

In the embodiment above, the pattern is optically readable and the sensor is therefore optical. The pattern can, however, be based on a parameter other than an optical parameter. In such a case, the sensor must of course be of a type which can read off the parameter concerned. Examples of such parameters are chemical, acoustic or electromagnetic marks. Capacitive or inductive marks can also be used.

It is recognized that many variations are possible within the scope of the present invention. The order of the above steps 101–106 can be varied within the scope of the invention. For example, detection of and compensation for displacement can be carried out before detection of and compensation for rotation and/or perspective. It is, however, preferable to carry out the displacement steps after the rotation and perspective processing steps, since the displacement steps then become particularly simple as far as calculations are concerned.

It is also possible to carry out the perspective processing steps before the rotation processing steps, suitably after having first converted the image into a set of dots. Such a step for detection of perspective can, for example, comprise the division of the image into a plurality of subsets, and detection of at least one direction in each subset, for example via Fourier analysis of the respective subsets. After this the change in the detected directions across the image is evaluated for the calculation of a transform that compensates for the perspective in the image. The same transform can possibly also compensate for rotation in the image plane. The evaluation can, for example, result in an identification of the image's vanishing points, which are then transformed into positions in infinity on the symmetry axes of the image, for example by means of a perspective transform of the type used in step 104 above. If the transformation only compensates for perspective, this is suitably followed by detection of rotation and compensation for this, for example in accordance with the above steps 101–102.

In addition, the marks can have a different appearance than described in the example above. Each mark can, for example, consist of a line or an ellipse, which starts at the virtual raster point and extends from this to a particular position. Alternatively, some other symbol can be used, such as a square, rectangle, triangle, circle or ellipse, filled-in or not.

Nor do the marks need to be arranged along the raster lines in an orthogonal raster but can also have other arrangements, such as along the raster lines in a raster with 60 degree angles, etc.

Figure 11:
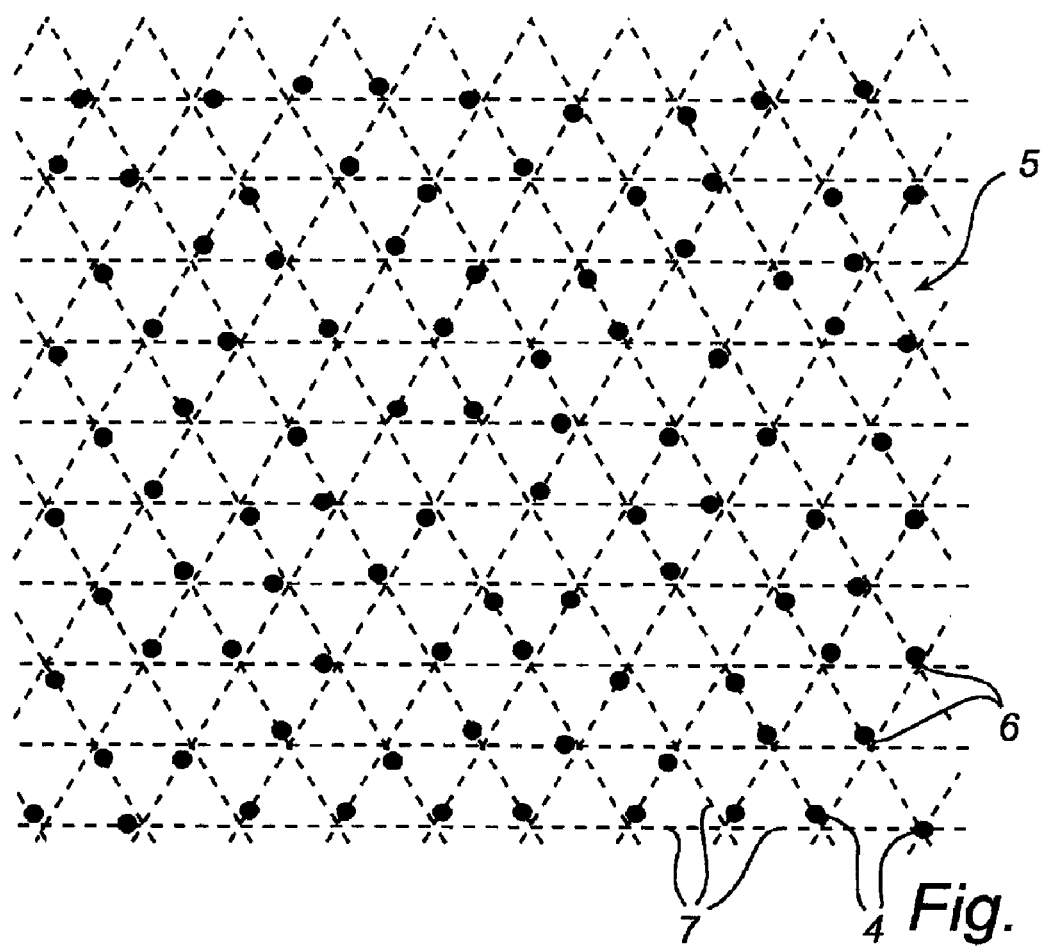
FIG. 11 shows a position-coding pattern with a triangular raster pattern.
Figure 12:
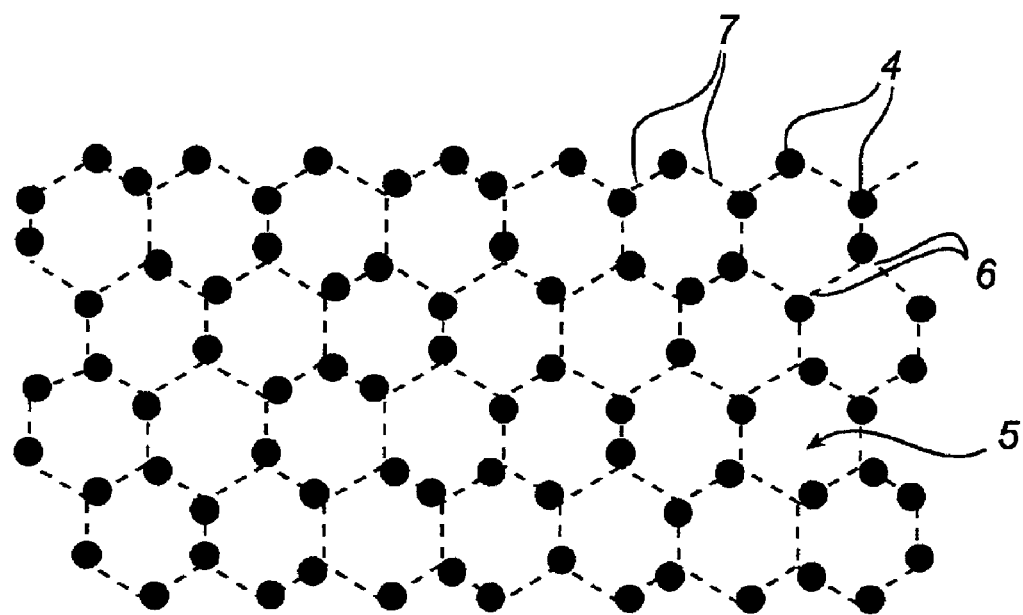
FIG. 12 shows a position-coding pattern with a hexagonal raster pattern.

Rasters in the form of triangles or hexagons can also be used, as shown in FIGS. 11 and 12. For example, a raster with triangles, see FIG. 11, enables each mark to be displaced in six different directions. In a hexagonal raster (honeycomb raster), see FIG. 12, the marks can be displaced in three different directions along the raster lines. In these cases the main vectors of the image are correspondingly more in number; in FIG. 11 there are three dominant raster directions, and in FIG. 12 there are three dominant raster directions.

As mentioned, the marks do not need to be displaced along the raster lines but can be displaced in other directions, for example in order to be located each in a separate quadrant of a square raster pattern. In the hexagonal raster pattern, the marks can be displaced in four or more different directions, for example in six different directions along the raster lines and along lines which are at 60 degrees to the raster lines. In an orthogonal raster, if necessary, only two displacements can be used.

It must also be pointed out that depending upon the available processing power, it can be possible to carry out the above-mentioned Fourier analysis based on all the actual image information that is recorded by the sensor. Similarly it can, if the processor power is sufficient, be possible to calculate a complete spatial frequency spectrum in two dimensions, as shown in the background to FIGS. 3, 5 and 8.

Those skilled in the art will also recognize that the analysis in the frequency domain described above can be implemented in a corresponding way in the wavelength domain.

Appendix A

An optical system with amplification m images the spatial coordinate (x,y,z) on the sensor coordinate ($x_s, y_s$) according to the projection formula:

$$\begin{cases} x_s = -m\dfrac{x}{z} \\ y_s = -m\dfrac{y}{z} \end{cases} \quad (1)$$

Assume now two points in the space, $P^1$ and $P^2$. These lie on an inclined plane, the z-component of which is described by $z=z_0+ax+by$. The points $P^1$, $P^2$ lie symmetrically on each side of the x-axis, in the position $x_0$, and have the coordinates:

$$\begin{cases} P^1 = (x_0, y_0, z_0 + ax_0 + by_0) \\ P^2 = (x_0, -y_0, z_0 + ax_0 - by_0) \end{cases}$$

After projection in accordance with (1) the points $P^1$, $P^2$ end up on the sensor coordinates $P_s^1$, $P_s^2$:

$$\begin{cases} P_s^1 = -\dfrac{m}{z_0 + ax_0 + by_0}(x_0, y_0) \\ P_s^2 = -\dfrac{m}{z_0 + ax_0 - by_0}(x_0, -y_0) \end{cases}$$

We now calculate the inclination in the sensor, $\Delta x_s / \Delta y_s$, between $P_s^1$ and $P_s^2$:

$$\frac{\Delta x_s}{\Delta y_s} = \frac{-m \cdot \left(\dfrac{x_0}{z_0+ax_0+by_0} - \dfrac{x_0}{z_0+ax_0-by_0}\right)}{-m \cdot \left(\dfrac{y_0}{z_0+ax_0+by_0} + \dfrac{y_0}{z_0+ax_0-by_0}\right)} = \qquad (2)$$

$$\frac{(z_0+ax_0-by_0) \cdot x_0 - (z_0+ax_0+by_0) \cdot x_0}{(z_0+ax_0-by_0) \cdot y_0 + (z_0+ax_0+by_0) \cdot y_0} = \frac{-bx_0}{z_0+ax_0}$$

A point $P^3$ in the center of the x-axis, in position $X_0$, $P^3=(x_0, 0, z_0+ax_0)$, is imaged in accordance with (1) by:

$$P_s^3 = -m \cdot \left(\frac{x_0}{z_0+ax_0}, 0\right) \equiv (x_s, 0) \qquad (3)$$

If we compare (3) with (2), we see that the inclination in the sensor is changed linearly in accordance with:

$$\frac{x_s}{y_s} = \frac{b}{m} x_s \qquad (4)$$

For reasons of symmetry, a corresponding equation applies to the inclination in the y-direction. Thus we now know:

$$\begin{cases} \dfrac{\Delta x_s}{\Delta y_s}(x_s) = \dfrac{b}{m} x_s \\ \dfrac{\Delta y_s}{\Delta x_s}(y_s) = \dfrac{a}{m} y_s \end{cases}$$

A raster situated on the inclined plane will, in addition to this strictly linear component, also contain a constant inclination, if the raster is not perfectly centered. We then get the following more general equation:

$$\begin{cases} \dfrac{\Delta x_s}{\Delta y_s}(x_s) = \dfrac{b}{m} x_s + mk_x \equiv kk_x \cdot x_s + mk_x \\ \dfrac{\Delta y_s}{\Delta x_s}(y_s) = \dfrac{a}{m} y_s + mk_y \equiv kk_y \cdot y_s + mk_y \end{cases} \qquad (5)$$

A general perspective can thus be described by the four variables $mk_x$, $mk_y$, $kk_x$, $kk_y$. It now remains to find the transform that restores the image coordinates to an orthogonal condition, given $mk_x$, $mk_y$, $kk_x$, $kk_y$. In order to do this, we first subtract the constant part of the inclination (originating from the remaining rotation) so that the inclination at the coordinate axes is zero:

$$\begin{cases} x_s^t = x_s - y_s \cdot mk_x \\ y_s^t = y_s - x_s \cdot mk_y \end{cases} \qquad (6)$$

(1) is then used to reverse-transform these rotation-corrected coordinates. It is possible without the loss of generality to put $z_0=m$, as this only results in a scaling of the coordinates. We have $$\text{from (1)}: \begin{cases} x = \dfrac{z \cdot x_s^t}{-m} \\ y = \dfrac{z \cdot y_s^t}{-m} \end{cases},$$

$$\text{from (5)}: \begin{cases} a = m \cdot kk_y \\ b = m \cdot kk_x \end{cases}$$

and the assumption: $z=m+ax+by$,
which gives us the non-linear equation system:

$$\begin{cases} x = \dfrac{(m + m \cdot kk_x \cdot x + m \cdot kk_y \cdot y) \cdot x_s^t}{-m} \\ y = \dfrac{(m + m \cdot kk_x \cdot x + m \cdot kk_y \cdot y) \cdot y_s^t}{-m} \end{cases}$$

whose solution is:

$$\begin{cases} x = -\dfrac{x_s^t}{1 - kk_x \cdot x_s^t - kk_y \cdot y_s^t} \\ y = -\dfrac{y_s^t}{1 - kk_x \cdot x_s^t - kk_y \cdot y_s^t} \end{cases}$$

where according to (6):

$$\begin{cases} x_s^t = x_s - y_s \cdot mk_x \\ y_s^t = y_s - x_s \cdot mk_y \end{cases}$$

What is claimed is:

1. A method for identifying a virtual raster pattern in an image of a plurality of marks, comprising:
   distinguishing at least some of the plurality of marks in the image, wherein each mark is associated with a respective intersection of raster lines belonging to the raster pattern; and
   identifying the virtual raster pattern based upon Fourier analysis of the image.

2. The method according to claim 1, comprising:
   converting the image to a set of unit pulses before the Fourier analysis, which unit pulses are placed at the positions of the marks in the image.

3. The method according to claim 2, wherein each unit pulse is placed at a center of gravity of the corresponding mark.

4. The method according to claim 1, further comprising:
   calculating a spatial frequency spectrum in two dimensions based upon said image;
   identifying at least two main vectors in said image, based on said frequency spectrum; and
   identifying the raster lines in the raster pattern based upon said main vectors.

5. The method according to claim 4, wherein the spatial frequency spectrum is calculated based on a two-dimensional Fourier transform along at least two directions in said image.

6. The method according to claim 4, wherein the spatial frequency spectrum is calculated on the basis of a central part of the image.

7. The method according to claim 4, wherein the identifying at least two main vectors further comprises:

localizing in the spatial frequency spectrum positions of peaks that exceed a given threshold value; and selecting said at least two main vectors based upon said positions.

8. The method according to claim 4, wherein the calculating a spatial frequency spectrum and the identifying main vectors therein further comprises:

changing a direction of a direction vector in steps within an angle range;

calculating at least one absolute value of the two-dimensional Fourier transform for the image based upon each such direction vector; and identifying absolute values that exceed said threshold value.

9. The method according to claim 8, wherein a length of the direction vector is changed within a frequency range that comprises a nominal spatial frequency of the raster pattern.

10. The method according to claim 9, wherein the length of the direction vector is changed in steps.

11. The method according to claim 8, wherein the calculating of the spatial frequency spectrum identifies peaks, the position of each of said peaks being localized by calculation of the center of gravity of the absolute values that exceed said threshold value and that are adjacent to each other in the spatial frequency spectrum.

12. The method according to claim 7, wherein the selecting at least two main vectors comprises:

letting each position identify a candidate vector;

letting at least one current image transform, which provides a given change in a relationship between two vectors, operate on said candidate vectors; and selecting as main vectors the candidate vectors that provide a required mutual relationship for said at least one current image transform.

13. The method according to claim 12, wherein each current image transform corresponds to a given image relationship between a sensor which records said image and an object which is provided with said plurality of marks.

14. The method according to claim 12, comprising:

sequentially letting a series of different current image transforms operate on said candidate vectors, at least until a required mutual relationship is achieved between said candidate vectors.

15. The method according to claim 12, wherein the raster pattern is identified based upon the image transform that gave rise to the required relationship between the candidate vectors.

16. The method according to claim 12, wherein the current image transform is selected on the basis of an earlier image transform that gave rise to the required relationship for a previous image.

17. The method according to claim 4, wherein said main vectors are selected on the basis of earlier main vectors that were determined for a previous image.

18. The method according to claim 4, further comprising:

transforming said marks with the main vectors as bases for producing a rotation-corrected image in which rotation of the marks over the plane of the image is essentially eliminated.

19. The method according to claim 18, further comprising:

compensating for perspective in the rotation-corrected image.

20. The method according to claim 18 wherein calculating of the spatial frequency spectrum identifies peaks therein, the method further comprising:

determining a width of the peaks corresponding to the main vectors in a spatial frequency spectrum of said rotation-corrected image; and compensating for perspective in the rotation-corrected image if the width exceeds a given width value.

21. The method according to claim 19, compensating for perspective further comprises:

measuring an inclination variation for the raster pattern along each main vector in the rotation-corrected image;

calculating a perspective transform based upon the measured inclination variation, which perspective transform essentially eliminates said inclination variation; and producing a perspective-corrected image by means of the perspective transform.

22. The method according to claim 21, wherein the measurement of the inclination variation for the raster pattern along a selected main vector further comprises:

calculating at least one subset main vector for each subset via Fourier analysis of at least two subsets of the rotation-corrected image distributed along the selected main vector;

identifying an initial position in the associated subset for each subset main vector; and calculating the inclination variation along the selected main vector based upon said subset main vectors and initial positions.

23. The method according to claim 22, wherein the initial position is identified based upon the center of gravity of the marks incorporated in the respective subset.

24. The method according to claim 18, further comprising:

measuring a phase displacement of one of the rotation-corrected and perspective-corrected image along the respective main vector based upon Fourier analysis of one of the rotation-corrected and perspective-corrected image; and localizing the raster pattern relative to said marks in the image based upon the measured phase displacements.

25. The method according to claim 24, further comprising:

calculating a normalizing transform that places intersections of the raster pattern a given distance apart; and operating the normalizing transform on the image in order to produce a normalized image.

26. A method for identifying a virtual raster pattern (5) in an image of a plurality of marks (4), each of which is associated with a respective intersection (6) of raster lines (7) belonging to said raster pattern (5), characterized by the steps of detecting main vectors of the image via Fourier analysis, compensating for rotation in the plane of the image on the basis of said main vectors, detecting a perspective in the image, if necessary, compensating for said perspective, and identifying the virtual raster pattern (5) on the basis of said main vectors.

27. A computer-readable computer program product which comprises a computer program with instructions for causing the computer to implement a method according to claim 1.

28. A device for position determination, comprising:
a sensor for producing an image of a partial surface of a surface which is provided with a position code in the form of a plurality of marks, wherein each of which is associated with one of a plurality of intersections belonging to a virtual raster pattern; and
an image-processor which is arranged to calculate a position for the partial surface based on a subset of the surface, wherein the image-processor identifies the virtual raster pattern in accordance with claim 1.

29. A device according to claim 28, which is hand-held.

30. A device according to claim 28, further comprising: a transceiver which wirelessly transmits position information.

31. A method of identifying a coordinate reference in an image containing a representation of a plurality of marks, for determining two-dimensional positions on a surface, comprising:
placing unit pulses at the positions of at least some of the representations of the plurality of marks;
generating a spectrum in two-dimensions based on the unit pulses;
determining at least two main vectors based on the spectrum, wherein the main vectors are associated with the dominant frequencies in the image;
detecting artifacts introduced during image acquisition; and
identifying the coordinate reference based upon the main vectors and detected artifacts.

32. The method according to claim 31, wherein each of the plurality of marks determine a value used in encoding position based on their direction of offset from intersection points of the coordinate reference.

33. The method according to claim 31, wherein unit pulses are placed at the center of gravity corresponding to each identified mark.

34. The method according to claim 31, wherein the two-dimensional spectrum is determined based on a portion of the image.

35. The method according to claim 31, wherein the determining further comprises:
finding positions of peaks having vector magnitude values exceeding a threshold value in the two-dimensional spectrum; and
selecting the at least two main vectors based upon the positions.

36. The method according to claim 35, further comprising:
incrementally changing the angle of a direction vector within a range;
calculating at least one magnitude value of the two-dimensional spectrum associated with the direction vector; and
identifying the magnitude value or values exceeding the threshold value.

37. The method according to claim 36, further comprising:
changing the length of the direction vector within a frequency range that includes a nominal spatial frequency of the coordinate reference.

38. The method according to claim 35, wherein the finding further comprises:

calculating a center of gravity of the adjacent magnitude values which exceed the threshold value; and
determining positions of the centers of gravity.

39. The method of claim 35, wherein the selecting further comprises:
representing each position by a candidate vector;
transforming the candidate vectors using a current transform chosen from a plurality of transforms, wherein the plurality of transforms modify a mutual relationship among the candidate vectors; and
selecting transformed candidate vectors associated with the current transform which produces a desired mutual relationship, and designating the transformed candidate vectors as the main vectors.

40. The method of claim 35, wherein the selecting further comprises:
representing each position by a candidate vector;
transforming sequentially the candidate vectors using a plurality of transforms, wherein the plurality of transforms modify a mutual relationship among the candidate vectors, until a desired mutual relationship is achieved; and
designating the transformed candidate vectors satisfying the mutual relationship as the main vectors.

41. The method according to claim 39, wherein the current transform corresponds to a geometric relationship between a sensor recording the image and a surface provided with the plurality of marks.

42. The method according to claim 39, further comprising: identifying the coordinate reference based on the image transform corresponding to the desired relationship among the candidate vectors.

43. The method according to claims 39, further comprising: selecting the current image transform based on a transform producing the desired relationship for a previous image.

44. The method according to claim 31, further comprising: selecting the main vectors based upon main vectors determined for a previous image.

45. The method according to claim 31, wherein the detecting and applying compensations further comprises compensating the image for unknown rotations.

46. The method according to claim 45, further comprising: removing the rotation from the image by transforming the unit pulses using the main vectors as a reference.

47. The method according to claim 31, wherein the detecting and applying compensations further comprises compensating for unknown perspective in the image.

48. The method according to claim 47, further comprising:
detecting the amount of perspective distortion by dividing the image into a plurality of subsets, and detecting at least one direction in each subset, in the two-dimensional spectrum of the respective subset; and
computing a transform which compensates for the perspective in the image and applying the transform to the image.

49. The method according to claim 31, wherein the detecting and applying compensations further comprises compensating for position displacements of the coordinate reference with respect to the unit pulses in the image.

50. The method according to claim 49, further comprising:
measuring phase values based upon the two-dimensional spectrum; and computing at least one displacement correction based upon the phase values.

51. The method of claim 31 further comprising applying compensation to a representation of said image to correct the detected artifacts.

52. An apparatus which identifies a coordinate reference for determining two-dimensional positions on a surface, comprising:

a sensor for acquiring an image of the surface containing a plurality of marks; and a processor which executes instructions for placing unit pulses at the positions of at least some representations of the plurality of marks in the image, generating a spectrum in two-dimensions based on the unit pulses, determining at least two main vectors based on the spectrum, wherein the main vectors are associated with the dominant frequencies in the image, detecting artifacts introduced during image acquisition, and identifying the coordinate reference based upon the main vectors and detected artifacts.

53. The apparatus according to claim 52, wherein the processor executes further instructions comprising:

finding positions of peaks having vector magnitudes exceeding a threshold value in the two-dimensional spectrum; and selecting the at least two main vectors based upon the positions.

54. The apparatus according to claim 53, wherein the processor executes further instructions comprising:

incrementally changing the angle of a direction vector within a range;

calculating at least one magnitude value of the two-dimensional spectrum associated with the direction vector; and identifying the magnitude value or values exceeding the threshold value.

55. The apparatus according to claim 54, wherein the processor executes further instructions comprising:

changing the length of the direction vector within a frequency range that includes a nominal spatial frequency of the coordinate reference.

56. The apparatus according claim 53, wherein the processor executes further instructions comprising:

representing each position by a candidate vector;

transforming the candidate vectors using a current transform chosen from a plurality of transforms, wherein the plurality of transforms modify a mutual relationship among the candidate vectors; and selecting transformed candidate vectors associated with the current transform which produces a desired mutual relationship, and designating the transformed candidate vectors as the main vectors.

57. The apparatus according to claim 56, wherein the current transform corresponds to a geometric relationship between a sensor recording the image and a surface provided with the plurality of marks.

58. The apparatus according to claim 34, wherein the processor executes further instructions comprising:

identifying the coordinate reference based on the image transform corresponding to the desired relationship among the candidate vectors.

59. The apparatus according to claim 52, wherein the compensating further comprises compensating the image for unknown rotations.

60. The apparatus according to claim 52, wherein the processor executes further instructions comprising:

removing the rotation from the image by transforming the unit pulses using the main vectors as a reference.

61. The apparatus according to claim 52, wherein the compensating further comprises compensating for unknown perspective in the image.

62. The apparatus according to claim 61, wherein the processor executes further instructions comprising:

detecting the amount of perspective distortion by dividing the image into a plurality of subsets, and detecting at least one direction in each subset, in the two-dimensional spectrum of the respective subset; and computing a transform which compensates for the perspective in the image and applying the transform to the image.

63. The apparatus according to claim 52, wherein the compensating further comprises compensating for position displacements of the coordinate reference with respect to the unit pulses in the image.

64. The apparatus according to claim 63, wherein the processor executes further instructions comprising:

measuring phase values based upon the two-dimensional spectrum; and computing at least one displacement correction based upon the phase values.

65. The apparatus of claim 52 wherein said processor further performs the step of compensating a representation of the image to identify the coordinate reference.

* * * * *